RESISTANCE ACTUATED CONTROL NETWORK

Filed June 15, 1949 2 Sheets-Sheet 1

Inventor
WILLIAM R. AYRES
By Morris Kahn
Attorney

Oct. 16, 1956 W. R. AYRES 2,767,244

RESISTANCE ACTUATED CONTROL NETWORK

Filed June 15, 1949 2 Sheets-Sheet 2

Inventor
WILLIAM R. AYRES

By Morris A. Rabkin

Attorney

United States Patent Office 2,767,244

Patented Oct. 16, 1956

2,767,244

RESISTANCE ACTUATED CONTROL NETWORK

William R. Ayres, Oaklyn, N. J., assignor to Radio Corporation of America, a corporation of Delaware Application June 15, 1949, Serial No. 99,281

13 Claims. (Cl. 179—1)

Figure 1:
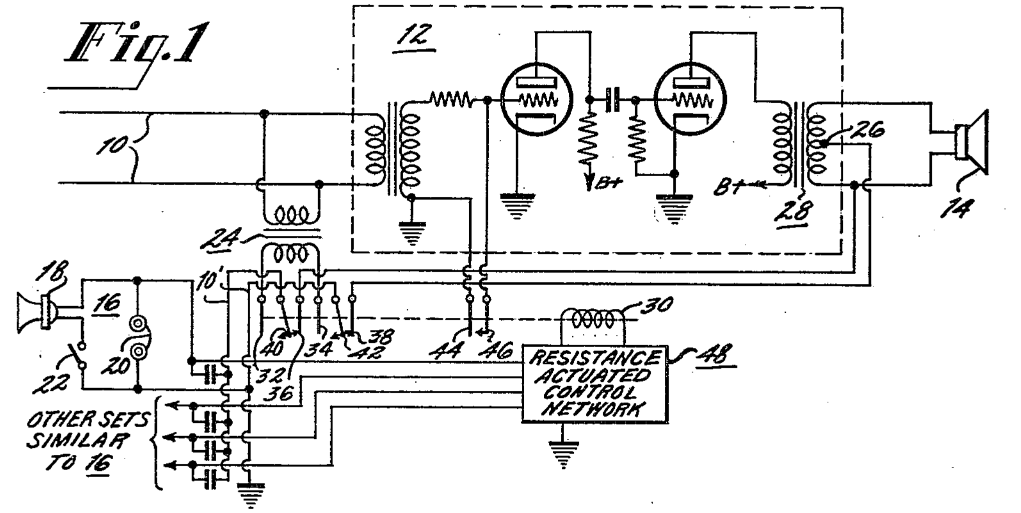

This invention relates to improvements in resistance actuated electrical control networks, and while not limited thereto, finds particular application in sound powered telephone systems, and will be described herein as applied to such a system.

As is well known, each of the individual units or "sets" in a sound powered telephone system consists of a transmitter or microphone section having a D. C. resistance of say 14 ohms or less, and a headset or receiver section having a resistance of, say, 28 ohms or higher. All of the receivers are usually connected in parallel across the common telephone line, and each set is provided with a "push-to-talk" microphone button which, when depressed, will connect the microphone for that particular set across the line. Consequently, each telephone set may be thought of as a variable resistor element having two possible resistance values.

In many instances, it is necessary to provide some kind of control circuit which will respond when one or more of the microphone buttons is depressed, but will remain inactive when all microphone buttons are released. For example, it is common practice to provide a power amplifier and a loudspeaker at various locations in the telephone system to serve an entire group at each such location without requiring an individual set for each member of the group. At the same time, some members of each group may require telephone sets to be able to send information to other locations. When one or more of the members in any one such group depresses his microphone button, problems of acoustical feedback and the like may develop unless some means is provided for automatically disabling the amplifier and/or the loudspeaker when any one of the local buttons is depressed.

It is, accordingly, a principal object of the present invention to provide an improved electrical control circuit responsive to resistance changes for performing a desired circuit controlling function.

Another object of the invention is to provide an improved control circuit responsive to changes in the resistance of any one of a plurality of resistors or resistive devices.

A further object of the invention is to provide an improved control circuit for a sound powered telephone system.

In accordance with the invention, the foregoing and other objects and advantages are attained by utilizing saturable reactors as sensing elements in a circuit for detecting changes in the resistance of any one of a plurality of resistor elements or resistive devices. For simplicity, the term "variable resistor" will be used herein and in the appended claims to refer to any electrical unit comprising one or more resistive elements and in which the overall resistance of the unit is variable either continuously, as in the case of a potentiometer, or in steps, as in the case of a sound powered telephone set. Each resistor controls the current flow through one winding of each reactor in order to control the A. C. impedance of a second winding of the reactor. A normally conducting electron tube is made responsive to changes in the impedance of the second reactor winding, and the output voltage from the electron tube is used to control the action of a relay or the like.

Figure 2:
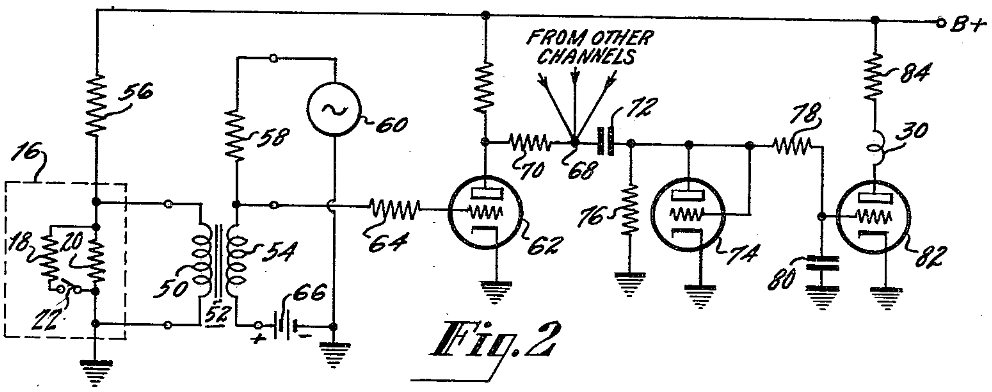

A more complete understanding of the invention may be had from the following description of illustrative embodiments thereof, when considered in connection with the accompanying drawing, wherein:

Figure 1 is a schematic diagram of a portion of a sound powered telephone system, illustrating one use for the control circuit of the present invention, Figure 2 is a schematic diagram of one complete control signal channel in a control circuit arranged in accordance with the present invention, and Figures 3, 4, 5, and 6 illustrate modifications of the circuit of Figure 2.

A specific embodiment of the invention which will be described herein will be explained in connection with the control of an amplifier for a sound powered telephone system, although it will be apparent that the invention is by no means limited to such application.

Referring to Fig. 1, a sound powered telephone line 10 is shown terminating in an amplifier 12, with the amplifier 12 being connected to a loudspeaker 14 which may serve a relatively large group at this particular terminal of the line 10. Four or more telephone sets 16, only one of which is shown in detail, are also provided at the same location, to allow two way communication between the location of the loudspeaker 14 and other stations on the line 10.

Each of the sets 16 consists of a microphone 18 and a headset 20, with a push-to-talk switch 22 for connecting the microphone 18 into the branch line 10′ when an operator has a message to transmit.

An isolation transformer 24 is provided for connecting the sets 16 to the main line 10, while a portion of the output of the amplifier 12, obtained from a tap 26 on an output transformer 28 in the amplifier 12, may be utilized to increase the signal level at each of the telephone sets 16 if desired.

Even if there were no electrical feedback path from the amplifier 12 to the telephone sets 16, acoustical feedback would make it undesirable to have the amplifier 12 in operation when any one of the switches 22 is closed. Moreover, if the sets 16 were to be connected permanently to the amplifier output, the output transformer 28 would load the microphones 18 unnecessarily when the latter were connected into the line 10′. Accordingly, it is necessary to provide a switching system for shifting the sets 16 from the amplifier output transformer 28 to the line transformer 24 when any one of the microphone buttons 22 is depressed and for simultaneously disabling the amplifier 12. Such a switching system may comprise a relay having a control winding 30, fixed contacts 32, 34 connected to the isolation transformer 24, fixed contacts 36, 38 connected to the amplifier output transformer 28, and movable contacts 40, 42 connected to the branch line 10′, as well as a set of contacts 44, 46 for disabling the amplifier 12. The relay winding 30 is supplied with control current from a resistance actuated control network 48, the details of which are shown hereinafter in Figures 2 through 6.

As was mentioned, the microphone 18 may have a resistance of 14 ohms or less, depending on the particular set involved while the headset 20 may have a resistance of from 28 ohms upward, again depending on the particular set. Accordingly, if the mere closing of any one or more of the push button switches 22 is to be used to control the current in the relay winding 30, a control network is required which will operate only in response to changes in resistance of, say, 14 ohms or more. In Fig. 2 of the drawing, one of the complete channels in a control network meeting the foregoing requirement is shown in detail. While a complete control signal channel for only one telephone set 16 is shown in Fig. 2, it will be understood that other channels can be connected into the control network at the point indicated in the drawing.

In Fig. 2, the microphone and the headset in a telephone set 16 are indicated schematically by resistors 18 and 20. The set 16 is connected in parallel with the D. C. winding 50 of a saturable reactor 52 (the term saturable reactor being used herein and in the appended claims to mean an electromagnetic device having at least two windings so arranged that the alternating current impedance of one of the windings, referred to as the A. C. winding, is a function of the amount of unidirectional current flowing in another of the windings, referred to as the D. C. winding). The parallel combination of the winding 50 and the set 16 is connected to a source of D. C. voltage (not shown) through a resistor 56, the resistance of which is preferably made considerably larger than either the largest resistance of the set 16 or the resistance of the winding 50 so that the sum of the D. C. currents flowing through the winding 50 and through the set 16 will remain substantially constant.

The A. C. winding 54 of the reactor 52 is connected in series with a resistor 58 across a source of A. C. voltage 60, so that the reactor winding 54 and the resistor 58 effectively form an A. C. voltage divider across the source 60. Consequently, variations in the impedance of the winding 54, caused by permeability changes of the associated core material due to variations in current flow through the D. C. winding 50, will result in changes in the alternating voltage across the A. C. winding 54.

When the effective resistance of the set 16 is high (i. e. when the switch 22 is open) a relatively large current will flow through the D. C. winding 50, the reactor 52 will be in a relatively high state of saturation, and the alternating voltage across the A. C. winding 54 will be relatively small. If the switch 22 is closed, shunting the relatively small resistor 18 across the winding 50, the current through the D. C. winding 50 will decrease, causing a corresponding increase in the impedance of the A. C. winding 54, and, hence, an increase in the voltage across the winding 54.

In reviewing the system requirements, it is apparent that the remaining portion of the control network of Fig. 2 must ignore alternating signal voltages of less than a first predetermined amplitude (corresponding to relatively high D. C. current flow through the winding 50), and must cause positive drop-out of a relay should the output voltage from the saturable reactor exceed a second predetermined amplitude (corresponding to low current in the winding 50).

The general scheme employed for accomplishing the foregoing is that of applying the alternating voltage output from each saturable reactor 52 to the control grid of a triode tube 62 associated with each reactor. The tube 62 operates as a "gate" to pass or reject signals from the reactor 52. For simplicity and economy, triodes are preferred over multigrid tubes, although the latter may be used if desired. Twin triodes are preferably used in order that an even number of control channels can be accommodated with half the number of tube envelopes. An additional twin triode can be used as a signal rectifier and a relay control tube. Preferred tubes for this application are types with reasonably high amplification factor and high transconductance, such as type "6V6," for example.

Referring, again, to Figure 2, the grid-cathode circuit of the gate tube 62 comprises a high resistance 64, the A. C. winding 54 of the reactor 52, and a source of positive grid bias voltage 66. The resistance of the resistor 64 should be relatively high, say, of the order of one megohm. The voltage applied through the resistor 64 to the control grid of the tube 62 will be the algebriac sum of the biasing voltage from the source 66 and the alternating voltage across the A. C. winding 54 of the saturable reactor. In a typical case, the D. C. bias voltage of the source 66 may be of the order of 25 volts, and the A. C. voltage across the winding 54 (with the switch 22 open) may be of the order of 14 volts (peak). Thus, the instantaneous voltage between the grid and cathode of the tube 62 will vary each cycle from about +39 to +11 volts.

It is well known that with the control grid positive, the grid-cathode resistance of a vacuum tube amounts to but a few thousand ohms or less. Thus, for the conditions described, the control grid of the tube 62 will never go positive (relative to its cathode) by more than a very small amount due to the high value of the series resistance 64, and will never go negative relative to the cathode as long as the switch 22 is open. Hence, the gate tube 62 will effectively disregard A. C. voltages across the winding 54 which have a peak value less than the D. C. voltage from the source 66.

Now suppose that the resistance of the set 16 is reduced to, say, 14 ohms by closing of the switch 22. The resulting reduction in reactor saturation will cause the alternating voltage across the A. C. winding 54 to rise, perhaps to a value of 27 volts peak. The instantaneous potential at the grid of the tube 62 now will vary each cycle from 25+27=52 volts to 25—27=—2 volts. During that portion of the cycle in which this potential is negative, the plate voltage of the tube 62 will be relatively high. Due to the usual amplification process, the positive plate-voltage pulse may have a peak value of the order of 60 volts under the conditions described.

As contrasted with a gating circuit in which a tube is normally cut off, and is turned on by control signals, the positive bias operation described has several advantages. One consideration is that the gating action will be virtually independent of the plate supply voltage for the tube, whereas the cutoff voltage would vary almost in direct proportion therewith. Also, the precise biasing voltage required to reduce the plate current to a given low figure is subject to considerably variation among tubes of the same "type" designation. Furthermore, the transfer characteristic of even the so-called sharp cut-off tube types is quite curved in the vicinity of cutoff, with the result that such tubes exhibit poor transconductance at the time when the greatest sensitivity is required in a control network of the type under consideration.

The function of the remainder of the network is to detect the positive "pulses" from the gate tube 62, and to operate a relay or the like in response thereto. The outputs of all channels corresponding to the individual telephone sets 16 at one location are joined at a point 68 through individual mixing resistances 70, which may be of the order of one-half megohm each. A capacitor 72, preferably of negligible reactance at the frequency of the source 60, couples the pulses from the tube 62 to a rectifier 74. During each positive pulse, the capacitor 72 will be charged through the rectifier 74, and during the idle portion of the cycle, the capacitor 72 will discharge through a resistor 76. As the result of this rectifying process, the voltage at the anode of the rectifier 74 will assume an average negative value which will be roughly proportional to the peak amplitude of the applied signal. A resistor 78 and a capacitor 80 are provided to filter out alternating components of the detector output before application thereof to the grid of a relay control tube 82.

In the absence of sufficient saturable reactor output to produce positive pulses at point 68, there will be no bias on the relay control tube 82, except for contact potential in the tube 82 and in the rectifier 74. Therefore, the relay tube 82 normally will be conductive, and the relay winding 30 connected in series therewith will be energized. A resistor 84 may be connected in series with the tube 82 to limit the no-signal plate current of the tube to a suitable value. If the switch 22 in one or more of the telephone sets 16 is closed, the peak value of the voltage across the A. C. winding 54 of the saturable reactor 52 associated therewith will exceed the bias voltage from the source 66 for a portion of the cycle, during which time the gate tube 62 and associated components will apply positive pulses to the rectifier 74. The unidirectional rectifier output will bias the relay control tube 82 in a negative direction to reduce the plate current of the latter and cause the relay to become deenergized.

With many telephone sets and associated control-tube circuits connected together, the pulses at the mixing point 68 will be lower in amplitude due to the loading of the active control tube by the inactive control tube circuits. This may require the use of a reduced bias voltage at 66 if one channel alone is to cause the relay to drop out. Such reduction in bias voltage will mean poorer discrimination against unwanted saturable reactor output signals corresponding to open switch conditions at the sets 16. Therefore, the permissible number of resistor elements 16 depends upon the relay "pull-in" and "drop-out" currents, upon component tolerances, and upon the accuracy with which critical quantities are adjusted to optimum values. However, a practical system has been built in accordance with the network shown in Fig. 2 to accommodate four telephone sets 16.

To accommodate a greater number of telephone sets or similar resistance devices, it is desirable to increase the amplification between the gate tube 62 and the rectifier 74. For a system of six control elements, sufficient increase in effective amplification may be had by simply isolating the rectifier 74 from the plate circuits of the gate tubes with a cathode follower stage. A cathode follower will, of course, give no voltage amplification, but in this instance it will effectively increase the channel gain by providing a high impedance termination for the mixer circuits and a low impedance driver for the rectifier. With such an arrangement, it is feasible to use small rectifiers of the selenium or germanium type. A circuit of this type is shown in Fig. 3.

Figures 3, 4:
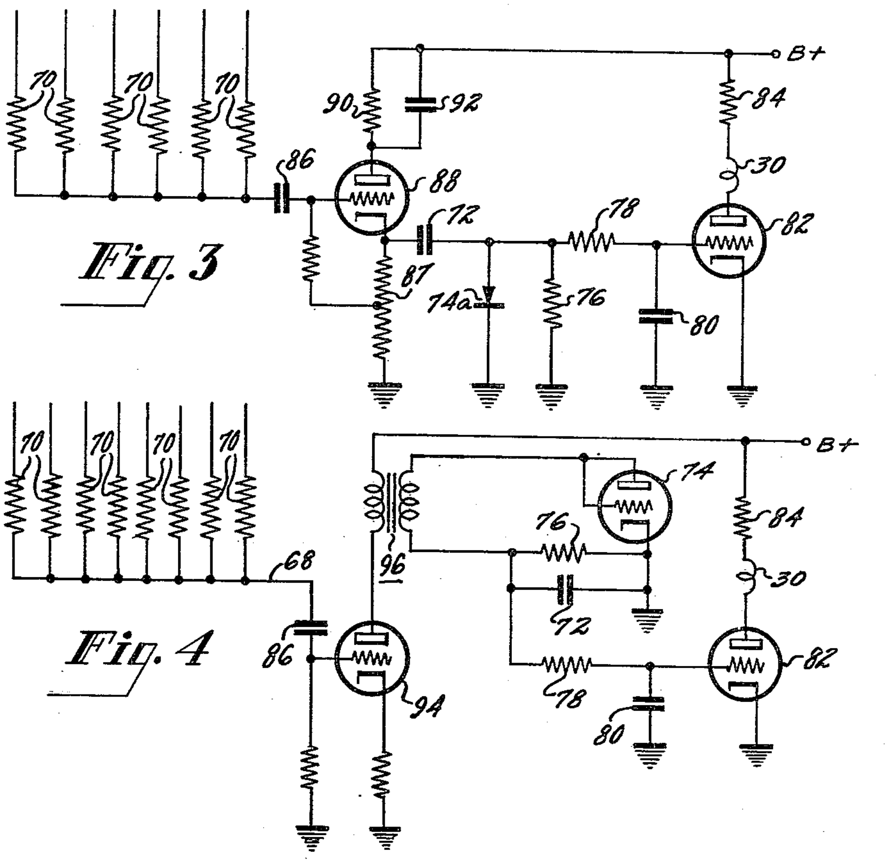

In Fig. 3, the mixing resistors 70 from the gate tubes (not shown in Fig. 3) are connected through a blocking capacitor 86 to the grid of a tube 88, which is connected as a cathode follower having a cathode load resistor 87. While the circuit is shown connected to provide some negative bias voltage for the tube 88, this connection is not essential since only positive voltage pulses are to be amplified.

To obtain suitable cathode follower characteristics and yet not have a high voltage between the cathode of the tube 88 and ground, a low plate voltage is preferred. In the absence of a low plate supply voltage, a plate dropping resistance 90 may be employed, bypassed by a capacitor 92.

The output of the cathode follower 88 is coupled to a rectifier element 74*a* through a capacitor 72, so that the capacitor 72 will be charged during the positive portion of the signal cycle. In idle portions of the cycle, the capacitor 72 will discharge through a resistor 76, and the operation of the circuit thereafter will correspond to that described for the circuit of Fig. 2.

A further modification of the network of Fig. 1 is shown in Fig. 4, wherein a conventional stage of amplification is used, with transformer coupling to produce the proper pulse polarity at the rectifier. In this case, the positive pulses from the various channels are all supplied to the grid of an amplifier tube 94. The tube 94 is coupled to a rectifier 74 by means of a transformer 96. The transformer coils are arranged to produce positive pulses on the anode of the rectifier 74 upon the occurrence of positive pulses at the mixing point 68. The capacitors 72 and 80 and the resistors 76 and 78 serve the same function in the network of Fig. 4 as in Figs. 2 and 3.

In some instances, it may be desirable to dispense with the transformer 96, and employ the more customary resistance-capacitance coupling circuits. This, of course, will require the use of two stages, or other non-phase-inverting scheme, to produce proper pulse polarity at the rectifier 74.

When additional amplification has been provided, as in Fig. 4, it becomes practical to use a "delayed" gating action for greater discrimination against unwanted signals. One convenient method for providing such delayed gating action is to positively bias the cathode of the rectifier 74. When such delay bias is provided, a certain minimum signal will be required on the rectifier anode before rectification will begin. The delay voltage should have a value slightly greater than the maximum positive pulse amplitude it is desired to eliminate.

Figure 5:
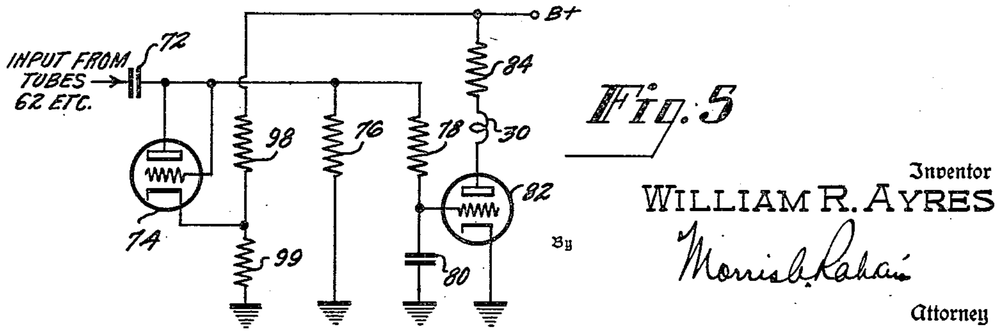

Fig. 5 shows a simple scheme for obtaining the delay bias. The cathode of the rectifier 74 is made positive relative to ground by connection to a voltage divider composed of two resistors 98, 99. The current through the resistors 98, 99 should preferably be large as compared with the peak charging current through the capacitor 72.

It will be understood that delay bias of the type provided in the network of Fig. 5, while useful in discriminating against small unwanted signals, will reduce the system sensitivity to the larger signals which are supposed to deenergize the relay. Furthermore, the effect of the delay bias upon the wanted signals has the objectionable effect of "sharpening" the pulses; i. e. of reducing the portion of the cycle during which capacitor charging current flows. Thus, for a given rectifier output voltage, the rectifier must conduct larger peak currents. Also, for a given control tube peak output voltage, the rectifier output will be lowered due to the delay bias because of the poor energy content of the pulse to be rectified.

In view of the foregoing, it is preferable to have the amount of delay bias automatically controlled by the signal level; i. e., to have relatively high delay bias when only low amplitude control pulses are present, and reduced delay or no delay at all when the control pulses increase to the point at which the relay should respond.

Figure 6:
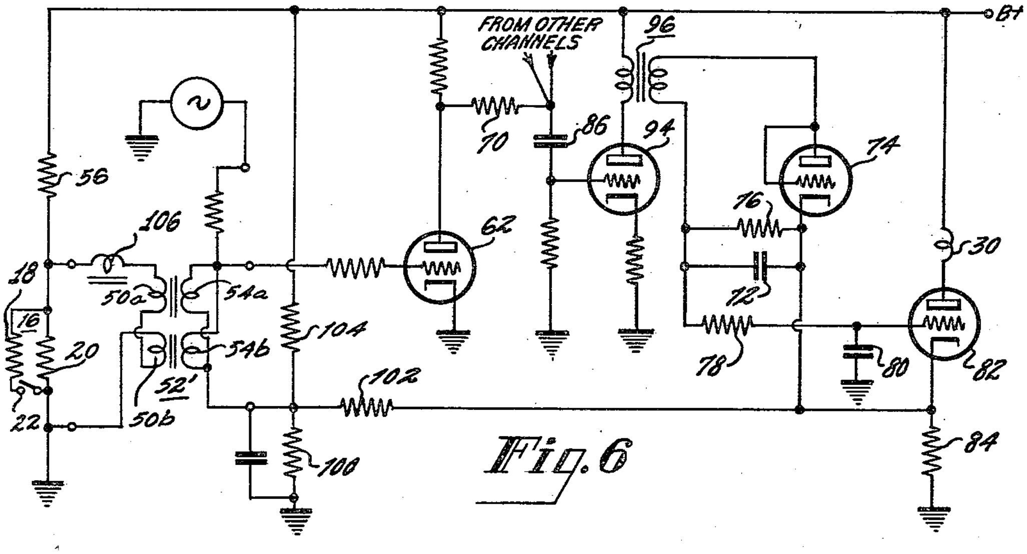

Figure 6 shows a control network providing automatic delay bias both on the individual channel gate tubes and on the rectifier, and also shows a preferred form of saturable reactor.

In Fig. 6, the relay control tube 82 has a current limiting resistor 84 connected in the cathode circuit to provide automatic bias control voltage for the network as well as to limit the "no-signal" plate current in the tube 82. The cathode of the rectifier 74 is returned to the ungrounded end of the resistor 84 so that the rectifier will receive a positive delay bias which will vary in magnitude in accordance with current flow through the tube 82. A fixed amount of positive bias for the rectifier is also provided by a voltage divider network, consisting of the resistor 84 and three additional resistors 100, 102, 104, connected across the power supply. The connection of the resistors 84, 100, 102, 104 is also such as to provide a bias voltage, made up of fixed and variable components, to the gate tube 62 through the A. C. windings 54*a*, 54*b* of a saturable reactor 52'. The reactor 52' will be considered in greater detail hereinafter.

In considering the automatic bias control effect obtained in the network of Figure 6, let it be assumed, first, that the bias voltages supplied to the rectifier 74 and to the gate tube 62 are such that the A. C. voltage across the windings 54*a*, 54*b* with the switch 22 open will not affect the tube 82. Now if the switch 22 is closed, reducing the resistance of the set 16, the peak alternating voltage across the A. C. windings 54*a*, 54*b* will exceed the delay voltage across the resistor 100, and the succeeding circuits will operate in the manner previously described to reduce the current flow in the relay control tube 52. At the same time, the voltage drop across the cathode resistor 84 will decrease, thereby reducing the delay bias on the gate tube 62 and on the rectifier 74.

Recalling that the grid-cathode signal on the gate tube 62 will be the algebraic sum of the D. C. bias voltage and the alternating voltage from the reactor 52′, it will be seen that a reduction in D. C. bias voltage will cause an effectively larger signal to be applied to the gate tube grid, with a further decrease in relay tube current. This action will continue until the relay tube 82 is cut off, at which time the positive voltage fed back to the rectifier and gate tubes 74, 62 from the resistor 84 will drop to zero.

When the switch 22 is reopened, the alternating voltage across the windings 54*a*, 54*b* will fall to a lower value. If the resistor 104 were not in the circuit to maintain some delay bias on the tubes 62 and 74, the circuit would fail to respond to reopening of the switch 22. Thus, once opened, the relay could not be closed again if it were not for the constant voltage developed by the voltage divider 104, 100. It can be seen that there is a compromise involved between positive response and loss of control in the network of Fig. 6. To obtain a satisfactory compromise, it has been found suitable to have the fixed portion of the bias to the gate tube 62 roughly twice as large as the delay voltage contributed by the relay tube 82 when the latter is conducting normally.

Turning now to a consideration of the reactor 52′, it will be noted that the reactor 52′ comprises two D. C. windings 50*a*, 50*b*, as well as the two A. C. windings 52*a*, 52*b* previously mentioned. In many instances, an ordinary two winding transformer is suitable as a saturable reactor, with the reactance of one winding being controlled by the degree of unidirectional magnetization in the transformer core. However, the impedance of the A. C. winding will be considerably influenced by the impedance in the circuit of the D. C. winding, as well as by the degree of magnetization. Moreover, alternating voltages induced in the D. C. winding may be objectionable in the D. C. circuit. Accordingly, an assembly may be arranged in which D. C. flux passes through the magnetic circuit of the A. C. winding, but in which little or no A. C. flux passes through the portion of the magnetic circuit about which the D. C. coil is wound. An alternative (and mechanically preferable) arrangement is shown schematically in Fig. 6, in which objectionable A. C. voltages in the D. C. circuit are substantially eliminated by utilizing two identical transformer assemblies, with A. C. windings 54*a*, 54*b*, and D. C. windings 50*a*, 50*b*. The A. C. windings 54*a*, 54*b* are connected in parallel, and the D. C. windings are connected in series opposition, so that the A. C. voltages induced in the D. C. windings 50*a*, 50*b* will have a mutual canceling effect as far as external circuits are concerned. A choke coil 106 will avoid adverse loading of the telephone circuit by the saturable reactor circuit.

Since many changes could be made in the apparatus shown and described, all within the scope and spirit of the invention, the foregoing is to be construed as illustrative, and not in a limiting sense.

What is claimed is:

1. An electrical control network operative in response to resistance changes, said network comprising a variable resistor, a saturable reactor having an A. C. winding and a D. C. winding, a source of voltage, means coupling said resistor and said D. C. winding to said source to establish a unidirectional current through said D. C. winding, the magnitude of said current being a function of the relative resistances of said resistor and of said D. C. winding, an A. C. voltage source coupled to said A. C. winding, circuit means coupled to said A. C. winding for establishing a D. C. voltage the magnitude of which is a function of the A. C. impedance of said A. C. winding as determined by the magnitude of said unidirectional current, and switch means coupled to said circuit means and responsive to changes in the magnitude of said D. C. voltage.

2. A control network as defined in claim 1 wherein said circuit means includes an electronic tube having an anode, a cathode, and a control grid, and a grid-cathode circuit for said tube including (1) said A. C. winding and (2) means maintaining substantially uniform current flow in said tube when said variable resistor is in a maximum resistance condition.

3. A control network as defined in claim 2 wherein said circuit means further includes an output circuit for said tube including a rectifier element for rectifying alternating voltage developed in said output circuit when said variable resistor is in a less-than-maximum resistance condition.

4. In an electrical control network, in combination a variable resistor, a saturable reactor having an A. C. winding and a D. C. winding, said resistor and said D. C. winding being connected in parallel, a source of D. C. voltage, first circuit means supplying a substantially constant total current from said source to said paralleled resistor and winding, second circuit means coupled to said A. C. winding for establishing a D. C. voltage the magnitude of which is a function of the A. C. impedance of said A. C. winding as determined by the amount of D. C. current flowing in said D. C. winding, and switch means responsive to changes in the magnitude of said D. C. voltage generated by said second circuit means.

5. An electrical control network responsive to changes in the resistance of a variable resistor, said network comprising a source of A. C. voltage, circuit means including said source coupled to said resistor for establishing a variable magnitude A. C. voltage the magnitude of which is a function of the magnitude of the resistance of said resistor, an electronic tube having an anode, a cathode, and a control grid, a grid-cathode circuit for said tube including (1) said circuit means and (2) means maintaining substantially uniform current flow in said tube when the magnitude of said variable A. C. voltage is less than a predetermined critical magnitude, and circuit means responsive to variations in the current flow through said tube for performing a desired control function.

6. An electrical control network responsive to changes in the resistance of a variable resistor, said network comprising a source of A. C. voltage, circuit means including said source coupled to said resistor for generating a variable magnitude A. C. voltage the magnitude of which is a function of the magnitude of the resistance of said resistor, second circuit means coupled to said first circuit means for establishing a D. C. voltage the magnitude of which is a function of the magnitude of said variable magnitude A. C. voltage, a relay having an operating winding, third circuit means connected to said winding and to said second circuit means and responsive to said D. C. voltage to control the amount of current flowing in said winding, and a feedback circuit coupled between said third circuit means and said first circuit means to control the magnitude of said variable magnitude A. C. voltage as an inverse function of the amount of current flowing through said operating winding.

7. A control network as defined in claim 6 wherein said first circuit means includes a saturable reactor.

8. A control network as defined in claim 6 wherein said second circuit means includes (1) an electronic tube having an anode, a cathode, and a control grid, and (2) a grid-cathode circuit for said tube, and wherein said feedback circuit is connected to said grid-cathode circuit to supply grid-cathode bias voltage to said tube.

9. An electrical control network containing a plurality of variable resistors and responsive to resistance variations of predetermined magnitude of any one or more of said resistors, said network comprising a source of D. C. voltage, a source of A. C. voltage, a control signal channel for each said resistor, each said channel including (1) a saturable reactor having a D. C. winding and an A. C. winding, (2) an electronic tube having an anode, a cathode, and a control grid, and (3) a grid-cathode circuit for said tube, said D. C. winding and said resistor in each channel being connected in parallel, means in each channel supplying a substantially constant total current from said D. C. voltage source to said paralleled resistor and winding, means coupling said A. C. winding to said A. C. voltage source to develop across each said A. C. winding an A. C. voltage having a magnitude determined by the A. C. impedance of each said A. C. winding, said A. C. winding in each channel being included in said grid-cathode circuit, means in each grid-cathode circuit maintaining substantially uniform current flow in each tube when the resistor associated therewith is in maximum resistance condition, rectifying means common to all said channels for rectifying A. C. voltage passed by said tubes, and switch means responsive to rectified voltage from said rectifying means.

10. An electrical network for controlling changes of the connections in an electrical system in response to changes between high and low resistance of a variable resistance element in said system, said network comprising, a saturable reactor having an A. C. winding and a D. C. winding, said D. C. winding being connected in parallel with said resistance element, a source of D. C. current, means supplying a substantially constant current from said source to said paralleled resistance element and D. C. winding, a source to A. C. voltage, means connecting said A. C. source to said A. C. winding to develop across said A. C. winding an A. C. voltage which is a function of the A. C. impedance of said A. C. winding, an electronic tube having a current control grid connected to receive A. C. voltage from said A. C. winding, voltage source means supplying to said control grid a bias voltage of magnitude and polarity sufficient to sustain substantially uniform current flow in said tube when said resistance element is in high resistance condition, and means including a current controlled switching device for changing connections in said system in response to changes caused in the current flow through said tube by variations in the resistance of said resistance element.

11. An electrical network as defined in claim 10 wherein said voltage source means includes a feedback circuit from said switching device connected to vary said bias voltage as an inverse function of the current flow through said switching device.

12. In an electrical control network operative in response to changes exceeding a predetermined amount in the resistance of a resistor, said network comprising, a saturable reactor having an A. C. winding and a D. C. winding, a source of D. C. voltage, said D. C. winding and said resistor being connected to said source in parallel to cause a magnetizing current to flow through said D. C. winding and said resistor in relative amounts determined by the relative resistance of said resistor and of said D. C. winding, means maintaining the sum of the currents flowing through said D. C. winding and said resistor at a relative constant value, an electronic tube having an anode, a cathode, and a current control grid, means supplying space current for said tube, a grid-cathode circuit for said tube including said A. C. winding, a source of A. C. voltage, a circuit including said A. C. voltage source and said A. C. winding for supplying an A. C. voltage to said control grid of a magnitude determined by the relative A. C. impedance of said A. C. winding, means normally biasing said control grid positive with respect to said cathode, and circuit means to perform a desired control function in response to variations of current flow in said electron tube.

13. In a control network for controlling a switching operation in a sound powered telephone system having a plurality of telephone sets each including (1) a relatively high resistance headset, (2) a relatively low resistance microphone, and (3) a switch for connecting said headset and said microphone in parallel, in combination, a saturable reactor associated with each of said telephone sets, each said reactor having an A. C. winding and a D. C. winding, each said headset being connected in parallel with its associated D. C. reactor winding, a source of substantially constant current connected in series with each said headset, a source of A. C. voltage, means connecting each said A. C. reactor winding to said A. C. voltage source to develop across said A. C. windings A. C. voltages of magnitudes determined by the A. C. impedances of said A. C. windings, an electronic tube for each of said reactors, each of said tubes being connected to receive A. C. voltage from its associated A. C. reactor winding, means normally sustaining substantially uniform current flow in each of said tubes during open switch conditions at each of said telephone sets, and means including a switching device responsive to changes in current flow in one or more of said tubes due to closing of said switch in the telephone set associated with said tube.

References Cited in the file of this patent

UNITED STATES PATENTS

| | | |
|---|---|---|
| 1,293,060 | Edwards | Feb. 4, 1919 |
| 2,112,682 | Ryder | Mar. 29, 1938 |
| 2,349,849 | Deal | May 30, 1944 |
| 2,483,450 | Wolfner | Oct. 4, 1949 |